United States Patent
Boyer et al.

(10) Patent No.: US 6,474,215 B1
(45) Date of Patent: Nov. 5, 2002

(54) ACTUATOR WITH APPROACH PRE-STROKE AND WORKING STROKE FOR OPERATING A TOOL

(75) Inventors: Jean-Noël Boyer, Mettray (FR); Olivier Tiberghien, Semblancay (FR); Daniel Chevassu, Chateau du Loir (FR)

(73) Assignee: Aro, Chateau du Loir (FR)

( * ) Notice: Subject to any disclaimer, the term of this patent is extended or adjusted under 35 U.S.C. 154(b) by 0 days.

(21) Appl. No.: 09/743,098

(22) PCT Filed: Jul. 6, 1999

(86) PCT No.: PCT/FR99/01626
§ 371 (c)(1),
(2), (4) Date: Feb. 21, 2001

(87) PCT Pub. No.: WO00/03145
PCT Pub. Date: Jan. 20, 2000

(30) Foreign Application Priority Data

Jul. 8, 1998 (FR) .............................. 98 08752

(51) Int. Cl.⁷ .................................. F15B 15/26
(52) U.S. Cl. .................................. 92/23; 92/62
(58) Field of Search .................. 92/23, 24, 27, 92/28, 62, 65, 66; 91/44; 269/32, 34

(56) References Cited

U.S. PATENT DOCUMENTS

| | | | |
|---|---|---|---|
| 2,568,228 A | 9/1951 | Forse | |
| 3,288,036 A | * 11/1966 | Fisher | .............. 92/62 |
| 3,576,151 A | 4/1971 | Sendoykas | |
| 3,661,052 A | 5/1972 | Lucien et al. | |
| 3,677,005 A | 7/1972 | Estlick | |
| 5,533,435 A | 7/1996 | Kita | |

FOREIGN PATENT DOCUMENTS

| | | |
|---|---|---|
| DE | 29 20 463 | 11/1980 |
| FR | 1.458.593 | 3/1966 |
| FR | 2.111.869 | 6/1972 |

* cited by examiner

Primary Examiner—Edward K. Look
Assistant Examiner—Thomas E. Lazo
(74) Attorney, Agent, or Firm—Larson & Taylor PLC

(57) ABSTRACT

The invention concerns an actuator (21) comprising a pre-stroke rod (29) which can be fixed to the tool body, for example soldering pliers. Thus by pressurising the pre-stroke chamber (27) the working rod (34) for closing the pliers can be brought into an intermediate small opening position, the working piston (31) and the amplifying pistons (36 and 37) remaining retracted in the actuator. Since the rod (29) can then be locked relative to the actuator body (21), pressurisation of the working chamber (32) and the amplifying chambers (38 and 40) will then cause the working rod to be extracted (34) and the soldering pliers to be closed without any recoil from the actuator body.

10 Claims, 8 Drawing Sheets

(PRIOR ART)

ACTUATOR WITH APPROACH PRE-STROKE AND WORKING STROKE FOR OPERATING A TOOL

The invention relates to an actuator effecting an approach pre-stroke and a working stroke for operating a tool, comprising an actuator body with at least two pistons slidable therein, either in the same direction or in two opposite directions, when extracted from the actuator body, namely a pre-course piston and at least one working piston joined to a working rod actuating the tool.

The tool will be designed to perform welding, stamping, stapling or any other assembly operations in which the tool or, conversely, the workpiece, is transported by a robot or a manipulator to form the different assembly points within the welding range. If the robot or the manipulator carries the workpiece to be assembled, the tool will be fixed on the ground. If the robot or the manipulator is carrying the assembly tool, the workpiece or workpieces to be assembled will be fixed relative to the ground. The invention applies to situations where the tool is provided with a closure system enabling the workpieces to be assembled to be clamped between two arms or two articulated jaws, the clamping action (working stroke) being effected following an approach pre-stroke of the tool.

A pneumatic (or hydraulic) actuator of the known type mentioned above, designed for the aforementioned applications for example, may be used in the context of the technique described below with reference to FIG. 1 of the appended drawings.

This drawing illustrates a welding station in elevation, at which an operator is applying weld spots with the aid of a welding clamp of an X-shaped design.

Figure 1:
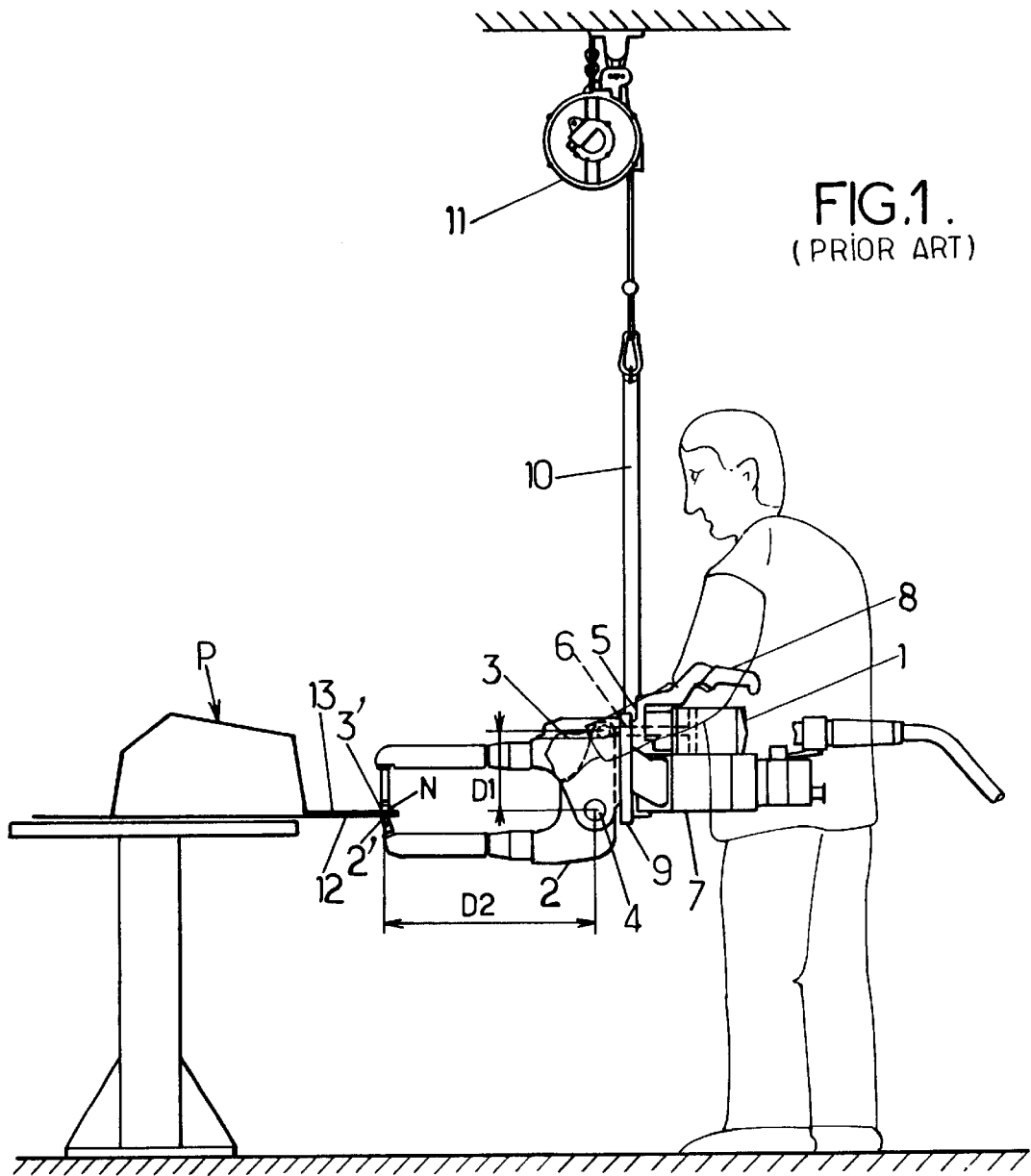

The clamp illustrated in FIG. 1 has top 3 and bottom 2 electrode-holder arms. The two arms are articulated one on the other about a pivot axis 4. An actuator, which may be a pneumatic actuator 1, for example, is attached, firstly, to the arm 2 by its rod 6 and, secondly, to the arm 3 by the body of the clamp 5. Optionally, the welding clamp may be fitted with a welding transformer 7.

In the example of a manual welding station illustrated here, the clamp is suspended on a counter-balance 11 by means of a giro circle 9 and a shaft 10, facilitating manipulation of the tool without the operator being hampered by the weight. The part P to which the weld spots are applied is assumed to be fixed relative to the ground.

The actuator and articulated link unit enable the clamp to be closed, i.e. to clamp the sheets 12 and 13 between the electrodes 2' and 3' in order to displace them towards one another. Once sufficient force has been produced, a current is passed through the workpiece to fuse a core between the workpieces 12 and 13. After cooling, this core becomes an assembly point N.

When the welding cycle is terminated, a command is issued to the actuator 1 to open the arms 2 and 3 so that the tool can be displaced to the next point in the welding range N+1.

If a C-design clamp is used instead of the scissor clamp, operation overall will be the same, the thrust force of the actuator 1 being directly transmitted to the electrodes 2' and 3'.

The practical constraints of this technique are as follows:
when the operator has moved the electrodes 2' and 3' above the next point in the welding range, a new welding cycle may commence. The thrust force on the actuator 1 is directly proportional to the surface to which this pressure is applied and to the air pressure in the different chambers of the welding actuator. For example, there would be several conceivable ways of producing sufficient force on the sheets for a given arm length D2 of the arms 2 and 3:
  by using a higher air pressure in the welding actuator 1;
  by increasing the diameter of the piston to which the pneumatic welding pressure will be applied;
  by multiplying the number of pistons by means of which the force will be transmitted, in which case these actuators will be "multi-stage actuators"; or
  by increasing the distance of the lever arm D1, in the case of what are known as "scissor" clamp.

In practice, the maximum pressure available remains limited and is usually between 5 and 10 bar in the case of a manual welding station. Furthermore, in the case of a welding clamp, whether it be robotic or manual, the constraints of weight, inertia, bulk, ergonomics and visibility of the welding point demand that the dimensions of each of the elements of the clamp be reduced as far as possible. In particular, it is impossible to increase disproportionately the diameter of the welding actuator, its length by multiplying the amplifier stages or, alternatively in the case of "scissor" clamp, its lever arm D1.

Accordingly, the technological difficulty inherent in a welding actuator is to multiply the number of stages whilst conserving the dual function and without disproportionately increasing the length of the actuator.

Finally, the constraints inherent in the welding range make it necessary to work with what is known as a "two stroke" actuator enabling a long stroke (approach pre-stroke), particularly when engaging and retracting the arms 2 and 3 from the tool, and a short stroke, referred to as the "working stroke", during the welding cycle in order to save time or to get round a "ceiling" obstacle preventing the open clamp from being fully re-opened.

In practice, the ratio between the short and the long stroke is usually between 2 and 5.

This need for an approach pre-stroke and a working stroke in a same actuator poses the following problems, explained with reference to FIGS. 1A, 1B and 1C where there are two pistons (approach pre-stroke and working stroke) moving in opposite directions and with reference to FIGS. 2A, 2B and 2C in the situation where there are two pistons (approach pre-stroke and working stroke) moving in the same direction.

Figure 1A:
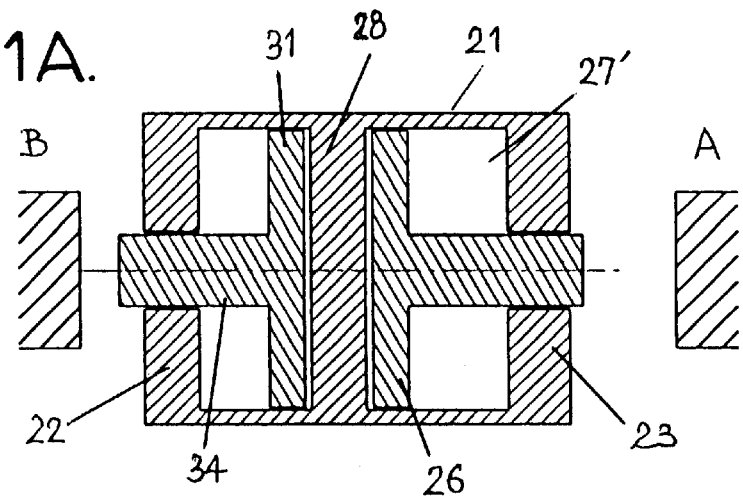
Figure 1B:
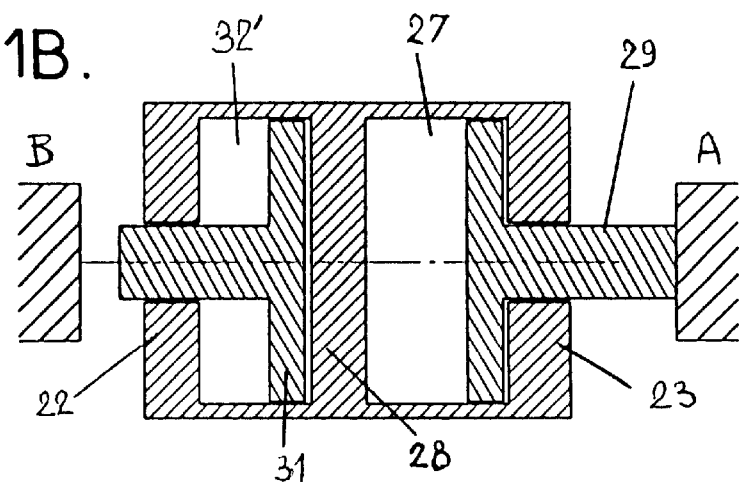
Figure 1C:
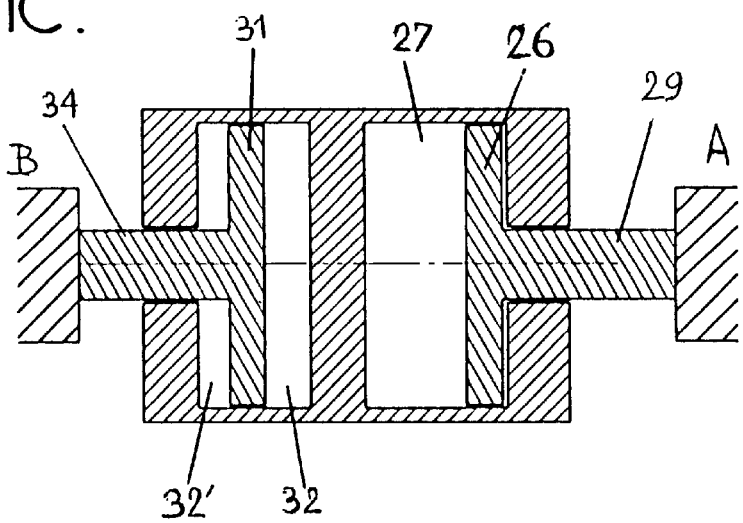

In FIGS. 1A to 1C, the body of the actuator (which may be pneumatic, for example) is denoted by reference 21, the pre-stroke piston and rod by 26 and 29 respectively, the pre-stroke pressure and evacuation chambers by 27 and 27' respectively, the working piston and rod by 31 and 34 respectively and the working pressure and evacuation chambers by 32 and 32' respectively. Reference 28 denotes an intermediate cylinder head and references 22 and 23 denote front and rear cylinder heads respectively closing off the body of the actuator 21. It is assumed that the tool is a clamp having two arms, articulated in an scissor arrangement, one controlled by the pre-stroke rod 29 operating the entire approach pre-stroke of the workpiece concerned between the fully open position of FIG. 1A and the slightly open position of FIG. 1B, whilst the other arm, controlled by the working rod 34, performs only the working stroke (clamping the workpiece) between the slightly open position of FIG. 1B and the closed position of FIG. 1C (supports A and B diagrammatically illustrating the two piston rods as they reach their respective stop positions—the fluid inlet and outlet orifices of the different chambers are not illustrated).

A two-stroke actuator of this design has the disadvantage of limiting the welding force to the lowest thrusts applied to the pre-stroke rod and the working rod. In effect, an imbalance between these two forces causes a displacement of the pistons 26 and 31 until they come into contact with one of the cylinder heads of the actuator.

In particular, with this design, the welding force can not be increased without increasing the pre-stroke force.

Figure 2A:
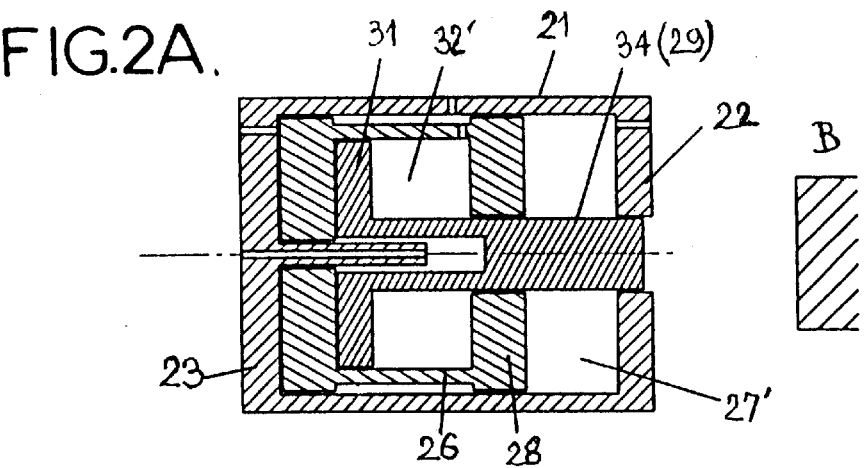
Figure 2B:
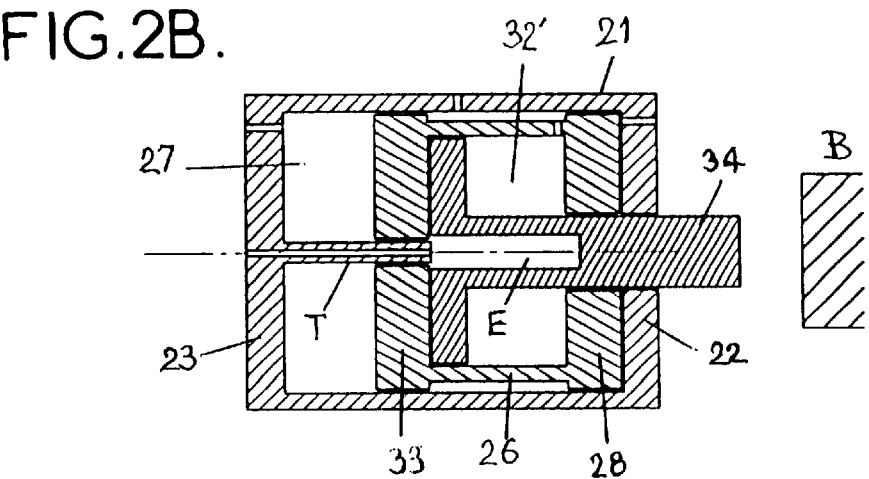
Figure 2C:
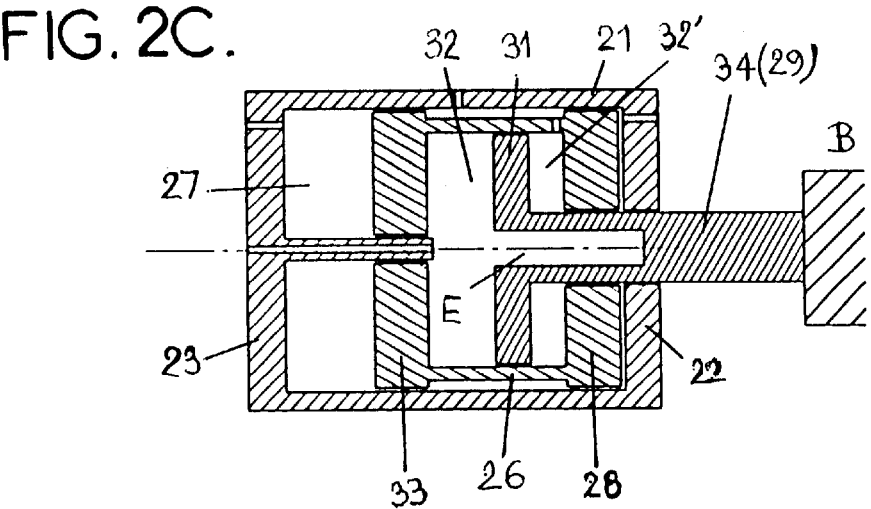

The same reference numbers as those used in FIGS. 1A to 1C are used to denote the same elements or elements fulfilling the same function in FIGS. 2A to 2C, which illustrate the prior art. However, the approach pre-stroke piston does not have a rod and is provided in the form of a cylinder 26 slidably mounted in the actuator body 21 and in which the working piston 31 may slide, the working rod 34 of which passes through the cylinder head 28 and the front cylinder head 22 of the body 21. In this embodiment, the rod 34 of the working piston also has an axial recess E opening into the working pressure chamber 32 which may receive a pipe T supplying pressurised fluid, passing through the rear cylinder head 23 of the actuator body 21 and the other cylinder head 33 of the pre-stroke piston 26.

Briefly, this device operates in the following way, still assuming that it controls the closure of clamp, for example a welding clamp: from the wide open position illustrated in FIG. 2A, the pressurised fluid admitted to the pre-stroke pressure chamber 27 pushes the pre-stroke piston 26 and the working piston 31 contained therein towards the right, into the slightly open position of FIG. 2B; the working rod 34 (which simultaneously acts as the pre-stroke rod 29) is only partially extracted at this stage. From this position, the arrival of pressurised fluid in the tube T causes a displacement of the working piston 31 towards the right inside the chamber 32–32' of the pre-stroke piston 26, which shifts the tool into the position in which the clamp is fully closed, i.e. into its position clamping the workpiece (FIG. 2C).

Again, a two-stroke actuator design of this type does not permit the use of a multi-stage structure for the actuator as a means of increasing the working power. Furthermore, in the same way as in the previous example, it is vital that the force allowing the work module to be clamped should be greater than or equal to that exerted on the working rod to generate the welding force. In practice, an imbalance between these forces would cause the work module to recoil back to the inlet with the working piston 31 in contact with the cylinder head 28. Such a design therefore makes it impossible to increase the welding force without increasing the pre-stroke force.

Dual stroke actuators (approach pre-stroke and working stroke) of the type described above pose other disadvantages when it comes to operating a multi-stage actuator, i.e. an actuator (and this applies in particular to pneumatic actuators) whose working piston is coupled with one or more amplification stages.

The disadvantage of using this multi-stage actuator technique is that, for a given diameter and pressure, the length of the actuator is increased as a minimum by its total stroke (working stroke and pre-stroke) at each added amplification stage. Since the volume of the chambers increases, the displacement time and force applied to the actuator increase accordingly. In practice, the constraints of bulk, balance, weight, inertia, ergonomics, visibility of the welding point and rapidity of the actuator limit the use of this type of actuator to a single multiplication stage.

The objective of this invention is to resolve all these problems inherent in the existing art and, to this end, the invention relates to an actuator effecting an approach pre-stroke and a working stroke, for manoeuvring a tool, comprising an actuator body in which at least two pistons may slide, either in the same direction or in two opposite directions when retracted from the actuator body, namely a pre-stroke piston and at least one working piston joined to a working rod actuating the tool, this actuator essentially being characterised in that it has locking means, at least in its retraction direction, between said pre-stroke piston and said actuator body, actuation of these locking means being controlled externally or automatically at the end of the pre-stroke travel or at the start of the working movement.

Since the pre-stroke piston can therefore be locked relative to the actuator body, the pressure on the working piston can be increased as desired without risking an imbalance and the approach pressure may therefore remain relatively low. For example, the number of amplifier stages can be multiplied without increasing the length of the actuator each time by the length of the approach stroke.

Also, as will become clearer farther on, a "two-stroke" function may be added to a single-stroke multi-stage actuator due to the autonomous hooking system constituted by the locking means. Accordingly, it is then possible to operate two opening processes during welding, whilst de-multiplying the force during the clamping phase and conserving a minimum actuator length and diameter.

In one embodiment, said locking means act between said actuator body and a pre-stroke rod joined to said pre-stroke piston.

This being the case and if said working rod and said pre-stroke piston are displaced in the same direction between their retracted position in said actuator body and their extracted position, the working rod may advantageously be slidably mounted in an axial compartment of the pre-stroke rod.

The locking means may be of various types. In one embodiment, the locking means comprise a lock designed to slide transversely in a front cylinder head of said actuator body, this lock being applied in the form of a small piston which can be displaced by means of external pressure to locate in a recess of said pre-stroke rod, compressing a return spring in an unlocking position. These locking means are therefore externally controlled.

In another embodiment, in particular (although not exclusively) in the case where the pre-stroke piston and the working piston are displaced in opposite directions when extracted from the actuator body, the actuator may be characterised in that said locking means comprise, in a rear cylinder head of the body of said actuator, a crown coaxial with said pre-stroke rod and designed so as to be returned to an unlocked position by peripherally acting springs, the rotation of this crown against this return force being effected by applying external energy or automatically as said pre-stroke piston reaches the end of its approach stroke, at which point it biases a lock or locks to be located in pockets of said pre-stroke rod. These are automatically controlled locking means in principle but it would also be conceivable to rotate the crown by applying external energy.

In the case of automatic control, said pre-stroke piston may have conical tips on its face directed towards said rear cylinder head, designed to engage in respective bores of said crown, causing the latter to pivot into its locked position, these tips being slightly offset from said bores when said crown is not operating, in the unlocked position.

In another embodiment providing automatic actuation but where the locking means may also be controlled externally by an energy source, the actuator may also be characterised in that it has a catch or catches biased by springs in a direction which causes them to project out from the lateral surface of said pre-stroke piston enabling them to locate in notches in the actuator body, thereby locking said pre-stroke piston relative to this body, at least in its retraction direction, said working piston having ramps designed to act on the tails of said catches as it returns to the fully retracted position, returning them to their retracted unlocked position.

In yet another variant, an actuator proposed by the invention may also be characterised in that said locking means comprise one or more locks radially displaceable in appropriate recesses in said pre-stroke rod and designed to engage in recesses of a front cylinder head of said actuator.

These locks may be located in said recesses by a positioning ramp of said working rod.

In another variant, said lock or locks may be engaged in said recesses by a positioning rod with a ramp slidably mounted on said working rod, inside said pre-stroke rod.

In another more specific embodiment, the actuator may also be characterised in that said positioning rod is manoeuvred by said working rod between a position in which said lock or locks are released and a position in which said lock or locks are engaged, this working rod having for this purpose, firstly, a shoulder designed to push said positioning rod axially, by means of an elastic element, towards the position in which said lock or locks are engaged and, secondly, an external stop designed to return said positioning rod, when said working rod is retracted, into the position in which said lock or locks are released.

Irrespective of the embodiment, said working piston may also be joined to one or more amplifier pistons, each being displaceable in an amplifier chamber to which said pressurised fluid is applied.

Various operating modes of the invention will now be described as examples, although these are not restrictive in any respect, with reference to the other appended drawings, numbered 3A to 3C, 4A to 4C, 5A to 5C, 6A to 6C and 7A to 7C, most of which are schematic diagrams, in axial section, showing different actuators proposed by the invention. These drawings are numbered, as with FIGS. 1A to 1C and 2A to 2C so that A represents an actuator in a totally retracted position, i.e. in the situation where it controls a tool of the clamp type or similar, letter B represents the actuator after the pre-stroke piston has been displaced to its end of approach position, i.e. in situations where it controls a tool of the clamp type or similar, a position in which the clamp is slightly open, and letter C represents the actuator after the working piston has been displaced to its working position, i.e. in the case where it controls a tool of the clamp type or similar, a position in which it is clamping the workpiece, for example. FIG. 4 is a front view of the locking means used in the embodiment illustrated in FIGS. 4A to 4C.

As far as possible, the same reference numbers as those used above are used to denote the same elements or similar elements fulfilling the same function.

Figure 3A:
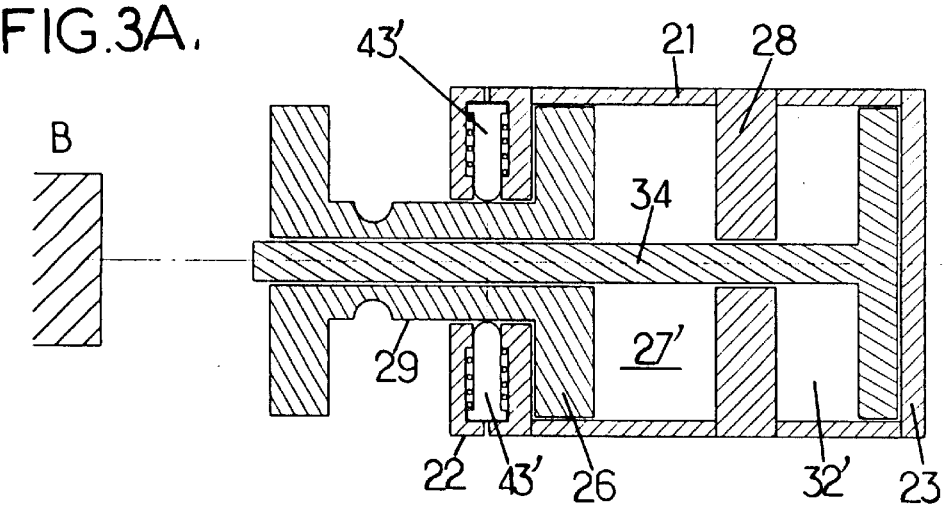
Figure 3B:
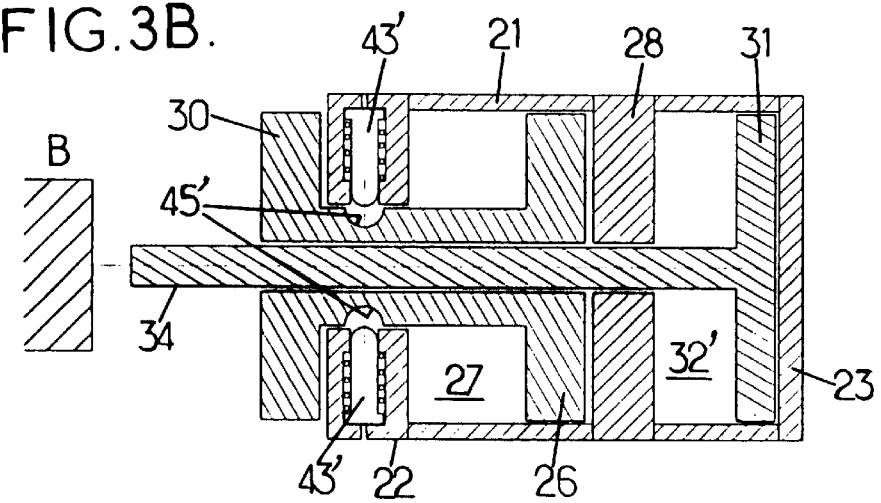
Figure 3C:
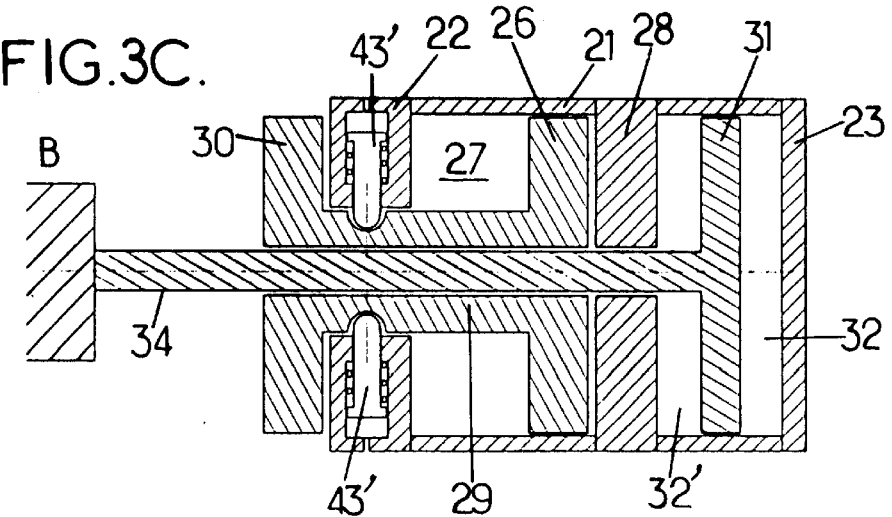

In the embodiment illustrated in FIGS. 3A to 3C, reference 30 denotes an enlarged region of the outer end of the hollow pre-stroke rod 29, by means of which this rod may be fixed to the body 5 of the tool (welding clamp) or to the frame of the welding machine (see FIG. 1). This enlarged region as well as the approach pre-stroke piston 26 should therefore be regarded as fixed parts relative to the support B. As may be seen, radial recesses are provided in the front cylinder head 22 for two locks 43', which are provided in the form of small pistons biassed towards the exterior by springs.

Starting from the fully open position illustrated in FIG. 3A (assuming that the actuator controls the closing action of a clamp or similar ), the approach of the working rod 34 is effected by delivering pressurised fluid into the pre-stroke pressure chamber 27, which displaces the actuator body 21 (and at the same time the working piston 31) into the position illustrated in FIG. 3B (slightly open position reached at the end of the pre-stroke), in which said locks 43' are facing pockets 45' in the pre-stroke rod 29. When pressurised fluid is applied to their heads, the locks 43' are displaced to the locking position in the base of the pockets 45'. The actuator body 21 is then locked relative to the pre-stroke piston 26. When pressurised fluid is delivered to the working pressure chamber 32, the working rod 34 is pushed into the clamping position on the support B (closed position illustrated in FIG. 3C) without causing any backlash in the actuator body 21, even if pressure in the chamber 32 is high.

In the operating mode of the actuator illustrated in FIGS. 3A to 3C, it is assumed that the working rod 34 was effecting both the pre-stroke displacement and, consecutively, the working displacement, the tool being considered as having two articulated arms, for example, one fixed and the other linked to the working rod 34.

Figure 4A:
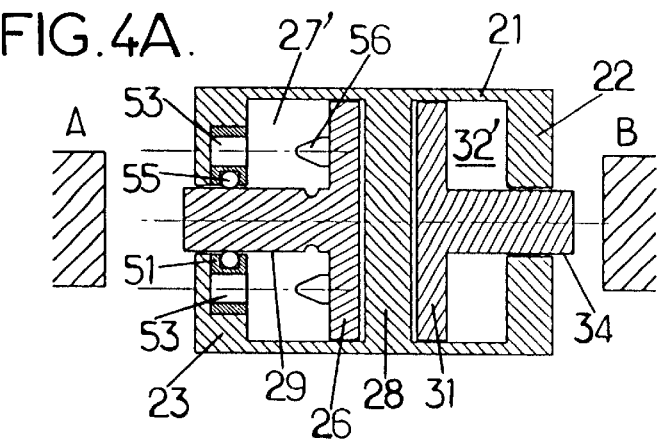
Figure 4B:
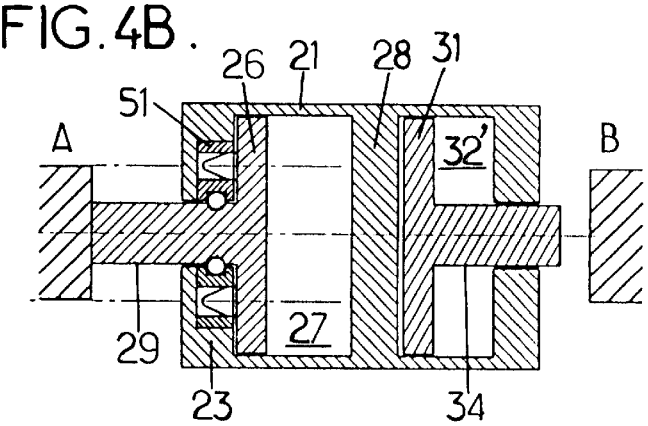
Figure 4C:
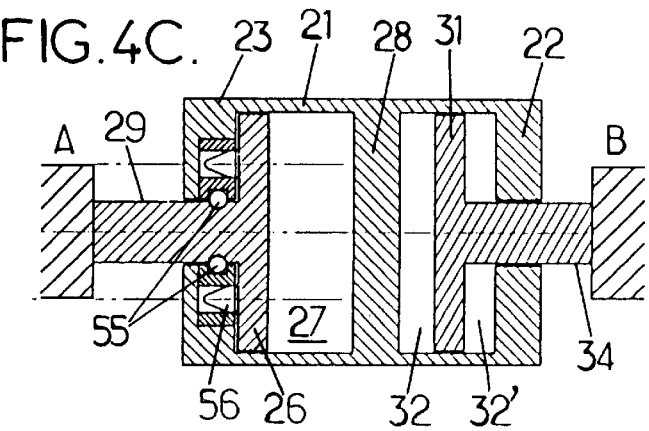
Figure 4:
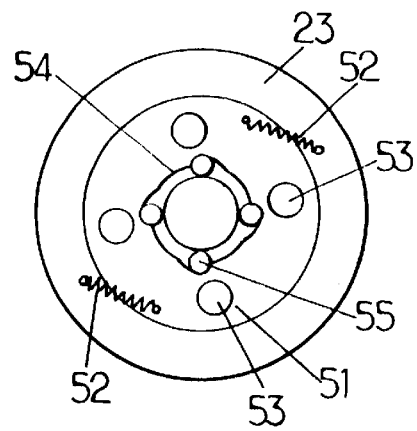

In the case of the actuator illustrated in FIGS. 4A to 4C, on the other hand, it is assumed that the clamp had two mobile arms: one linked to the pre-stroke rod 29, effecting the approach displacement (until it abuts against the support A) and the other linked to the working rod 34, performing the complementary clamping stroke, symbolised by this rod in abutment on the support B. In this case, the actuator body 21 additionally has means by which it can lock the pre-stroke rod 29. To do this, a rotating crown 51 is provided in the rear cylinder head 23 of the actuator body, coaxial with the pre-stroke rod 29 and designed to be returned to a release position by peripherally acting springs 52 (FIG. 4) connected between this crown and the cylinder head. This crown has four bores 53 provided axially therein and has, centrally, a cam 54 with lock bearings 55. This cam has four pockets in which the bearings 55 can be located in the unlocked position, simply bearing against the smooth surface of the pre-stroke rod 29.

Facing the cylinder head 23, the pre-stroke piston 26 has four conical tips 56 which, in the non-operating position, are slightly offset from the axis of the bores 53.

From the position in which the clamp is fully open illustrated in FIG. 4A, the pressurised fluid injected into the chamber 27 (evacuated via the chamber 27') causes the pre-stroke piston 26 to be displaced to the left until its rod 29 abuts against the support A, which switches the clamp or similar into its slightly open position (the body 21 of the actuator is fixed in this case). By penetrating the bores 53 of the crown 51, the conical tips 56 cause a rotating motion (the piston 26 being prevented from pivoting), which, by rotating the cam 54, forces the bearings 55 to engage in corresponding pockets of the pre-stroke rod 29. The actuator body 21 is therefore locked relative to this rod and the support A. When fluid is injected into the working pressure chamber 32, even at high pressure (with chamber 32' acting as the evacuation), there is no risk of backlash from the actuator body 21: this fluid can only push the working rod towards the right until it has reached the position in which the clamp is closed, symbolised by the rod 34 in abutment against the stop B (FIG. 4C).

It goes without saying—and this applies to all the embodiments—that the return from position C to position B or from position B to position A is effected, naturally, by applying pressure to the chambers 27' and 32' with evacuation via the chambers 27 and 32.

Figure 5A:
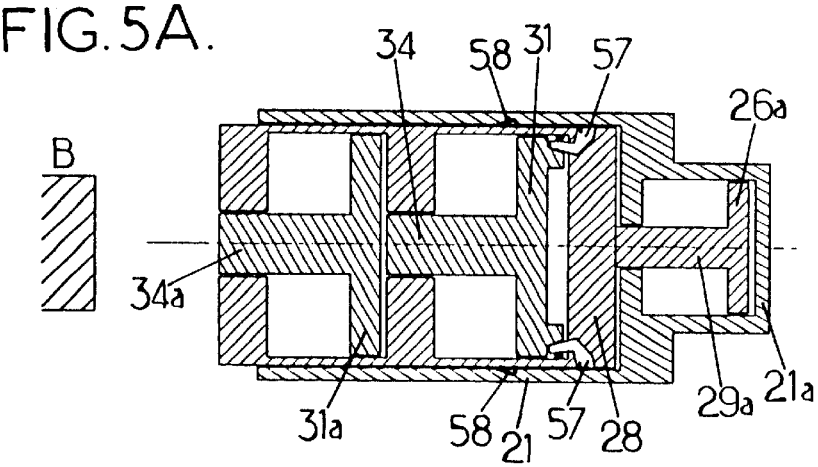
Figure 5B:
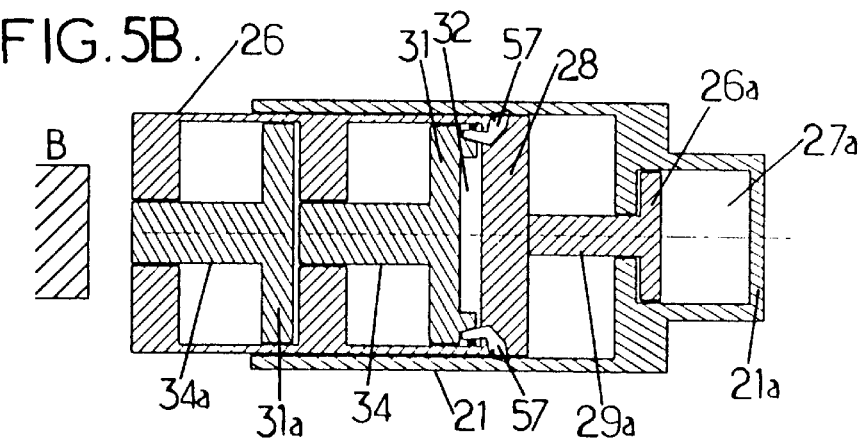
Figure 5C:
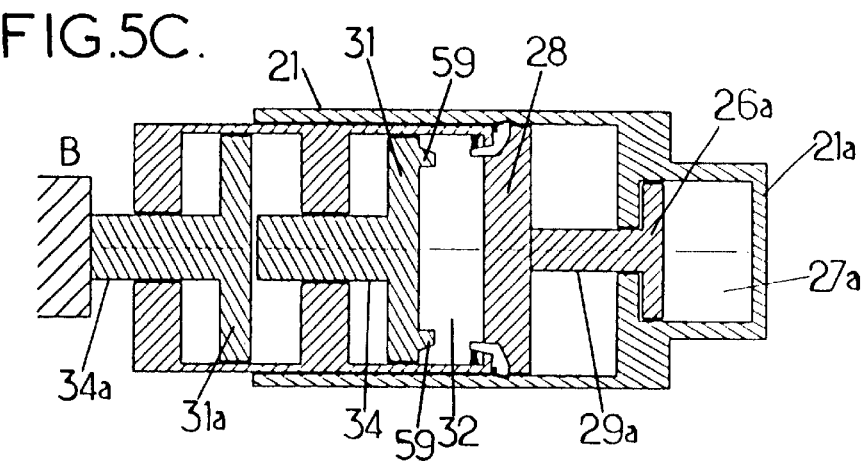

In the embodiment illustrated in FIGS. 5A to 5C, and in a manner similar to that described above with reference to the prior art illustrated in FIGS. 2A to 2C, the pre-stroke piston 26, slidably mounted in the body 21 of the actuator, is provided in the form of a cylinder receiving a working piston 31 and its working rod 34, as well as an amplifier piston 31a and its rod 34a for actuating the tool. This pre-stroke piston 26 is actuated by an auxiliary pre-stroke piston 26a mounted in a cylinder 21a constituting an extension of the actuator body 21, the auxiliary pre-stroke rod 29a of which is linked to a rear cylinder head 28 of the pre-stroke piston 26. Pivotally mounted in this cylinder head 28 are two catches 57 returned by springs in a direction which causes them to project beyond the lateral surface of the pre-stroke piston 26 enabling their ends to engage and lock in notches 58 of the actuator body 21 (FIG. 5A). The working piston 31 has two lugs with ramps 59 on the side of the working pressure chamber 32 (FIG. 5C), designed to act on the tails of the catches 57, moving them into a retracted unlocking position as the piston 31 moves towards the cylinder head 28.

This being the case, this device operates as follows: from the fully open position illustrated in FIG. 5A, the pressure admitted to the auxiliary pre-stroke pressure chamber 27a causes the auxiliary pre-stroke piston 26a and the pre-stroke piston 26 to be displaced towards the left. Clearly, this displacement causes an equal displacement, towards the left, of the working piston 31 as well as the actuating rod of the tool 34a. The unit is then in the slightly open or end of pre-stroke position, illustrated in FIG. 5B.

Once pressure is admitted to the working pressure chamber 32, the working piston 31 starts to move towards the left, releasing the catches 57, the ends of which will then engage in the notches 58 of the actuator body 21: the pre-stroke piston 26 is then prevented from moving to the right, relative to the body 21, even under the effect of a high pressure in the chamber 32. This pressure, which may optionally be amplified by the amplifier stage, therefore causes a thrusting motion of the piston 31a and the actuating rod 34a into the position in which the tool effects a clamping and closing action (FIG. 5C).

On returning to the position illustrated in FIG. 5B, the working piston 31 will release the catches 57, which will unlock the pre-stroke piston 26, enabling it—and the rod 34a—to return to the fully open position illustrated in FIG. 5A.

A detailed description of how the invention operates will now be given, again by way of illustration and not restrictive in any respect, with reference to FIGS. 6A to 6C, which illustrate an axial section of a two-stroke multi-stage pneumatic actuator as proposed by the invention in its different operating positions.

The cylindrical body 21 of the pneumatic actuator is closed at its ends by a front cylinder head 22 and a rear cylinder head 23. Laterally, it has pipes 24 and 25 which co-operate with valves enabling compressed air to be admitted to or evacuated from the different chambers of the actuator, depending on the different operating phases, in a manner which need not be explained in any further detail.

Displaceable in the body 21 of the actuator are:
a pre-stroke piston 26 in a pre-stroke pressure chamber 27 extending between the front cylinder head 22 and an intermediate cylinder head 28, this pre-stroke piston being joined to a hollow pre-stroke rod 29 bearing an enlarged region 30 at its outer end, by means of which it can be fixed to the body 5 of the tool (welding clamp) or to the frame of the welding machine;
working piston 31 in a working pressure chamber 32 extending between the intermediate cylinder head 28 and another intermediate cylinder head 33, this working piston being joined to a working rod 34 slidably mounted in the pre-stroke rod 29 by means of a positioning rod with a ramp 35. The outer end of the working rod 34, projecting out from the positioning rod 35, will actuate a mobile part of the tool so that it can apply the clamping force necessary for the clamp to perform the welding operation, for example on the sheet to be welded;
two amplifier pistons 36 and 37 mounted in amplifier chambers 38 respectively, extending between the intermediate cylinder head 33 and yet another intermediate cylinder head 39, and 40 extending between the intermediate cylinder head 39 and the rear cylinder 23. These two pistons 36 and 37 (of which there may be a larger number) are joined respectively to rods 41 and 42, by means of which they are able to exert a complementary thrust motion on the working rod 34.

The body 21 of the pneumatic actuator can be axially displaced relative to the fixed pre-stroke rod 29, where it can be locked. To this end, the actuator has a set of lock bearings 43, mounted in recesses 44 of the pre-stroke rod 29 and designed to engage in pockets 45 of the cylinder head 22 as a result of the action of the positioning rod with ramp 35 mentioned above, which has a bulge 46 at the end of the ramp and is mounted so as to be axially slidable between the working rod 34 and the pre-stroke rod 29.

The positioning rod 35 can be axially manoeuvred in the two directions, on the one hand by means of a spring 47 compressed between a shoulder 48 of the working rod 34 and ring 49 inserted between the rods 34 and 35, and on the other by a stop 50 provided close to the outer end of the working rod 34 and designed to bear on the free end of the positioning rod with a ramp 35.

This being the case, the pneumatic actuator described above operates as follows:
in the position illustrated in FIG. 6A, pressure has been established in the chambers 27, 32, 38 and 40, on the rear face of the pre-stroke piston 26 and on the front face of the working piston 31 and amplifier pistons 36 and 37. The pressure in the chamber 27 causes the intermediate cylinder head 28 to recoil (relative to the tool and the fixed pre-stroke rod 29) and hence the body 21 of the actuator, whereas the pressure in the chambers 32, 38 and 40 (or in any single one of them) maintains the working rod 34 in its position farthest away from the tool.

Figure 6A:
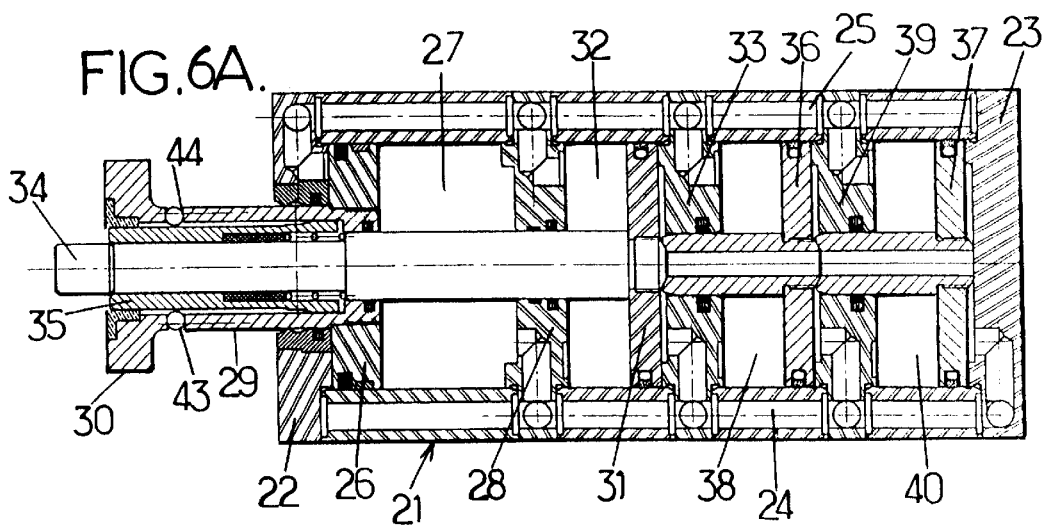
Figure 6B:
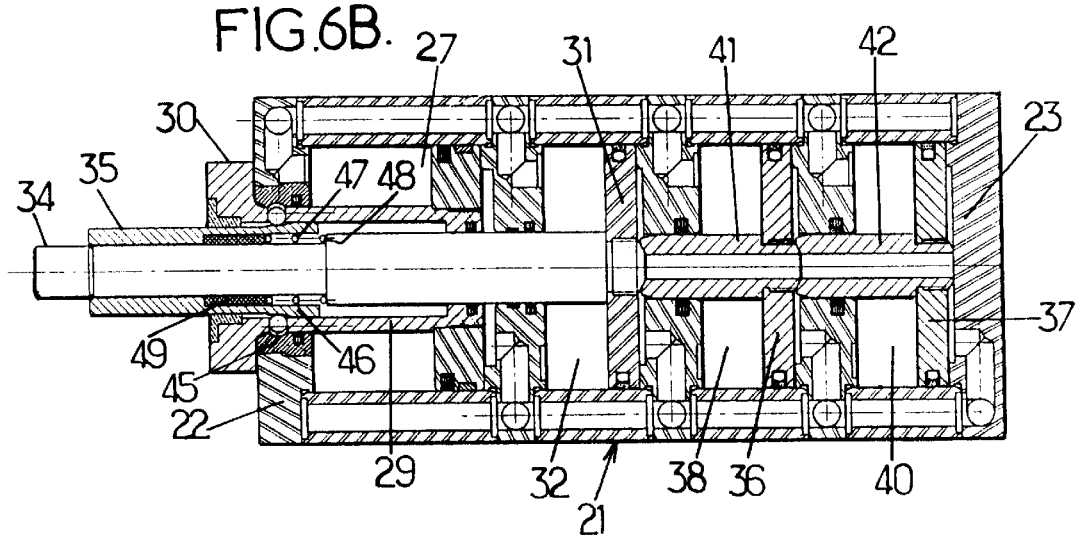

From this position, it is possible to reach the position in which the clamp is slightly open by maintaining the pressure on the front face of the pistons 31, 36 and 37 and by also applying pressure to the front face of the pre-stroke piston 26, the other part of the chamber 27, previously under pressure, then being switched to evacuation mode (to the right of the piston 26 in FIG. 6B). Since the piston 26 is fixed relative to the tool, as is the pre-stroke rod 29, the pressure applied to the front cylinder head 22 causes the actuator body 21 to be displaced towards the tool, along with that of the working rod 34, which then assumes the position in which the welding clamp is slightly open.

From this slightly open position illustrated in FIG. 6B, it is possible to revert to the wide open position illustrated in FIG. 6A by restoring the pressure on the rear face of the pre-stroke piston 26 or a command can be issued to switch to the closed position of the clamp in order to perform the clamping operation on the sheets 12 and 13 and the welding operation.

Figure 6C:
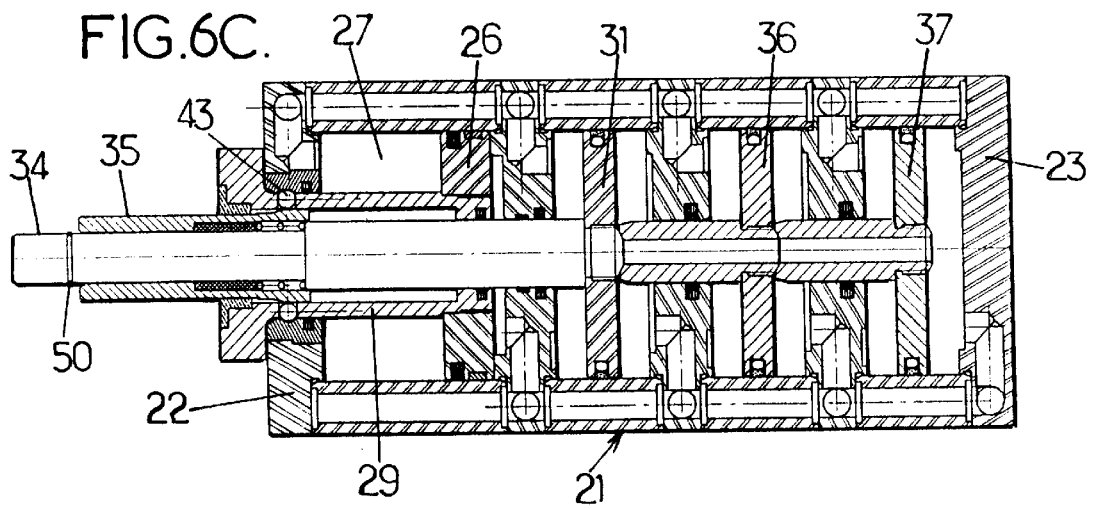

To do this, it is sufficient to maintain the pressure on the front face of the pre-stroke piston 26 in order to retain the actuator body 21 in the position illustrated in FIGS. 6B and 6C and to apply pressure to the chambers 32, 38 and 40 on the rear face of the working piston 31 and amplifier pistons 36 and 37 (the compartment opposite these chambers, on the side of the front face of these pistons, being switched to evacuation mode, of course).

As a result, the working rod 34 is displaced relative to the actuator body 21 towards the left of FIG. 6C, which causes the pre-stroke rod 29 to lock onto the actuator body 21: in effect, the bulge 46 of the positioning rod 35, subjected to a thrust motion by the spring 47 bearing on the shoulder 48 of the working rod, biases the bearings 43 towards the exterior and locks them in the base of the pockets 45 in the front cylinder head 22. The pressure prevailing in the working chamber 32 and in the amplifier chambers 38 and 40 (on the rear face of the corresponding pistons) can not therefore cause the actuator body 21 to recoil towards the right. This body is locked in the position illustrated in FIG. 6C and this pressure can therefore only cause the working rod 34 to be displaced to the working position illustrated in FIG. 6C, corresponding to the position in which the welding clamp is closed.

Once the welding effect has been applied, the bearings 43 apply a high pressure on the positioning rod 35, which locks as a result. This prevents any continuation of the axial displacement of the working rod 34 in the extraction direction since this rod is still ale to slide in the positioning rod 35 by compressing the spring 47. The displacement of the electrodes 2' and 3' (or any other tool) in the clamping direction is therefore not prevented whilst they are exerting their force.

A return from the working position illustrated in FIG. 6C to the slightly open position illustrated in FIG. 6B can be effected by reversing the pressure in the working 32 and amplifier 38 and 40 chambers, causing the working rod 34 to retract into the body 21. During this retraction, the stop 50 of the rod 34 bearing on the end of the positioning rod 35, releases the body 21 of the actuator and the pre-stroke rod 29, as a result of which the fully open position illustrated in FIG. 6A is resumed in the manner described above.

Figure 7A:
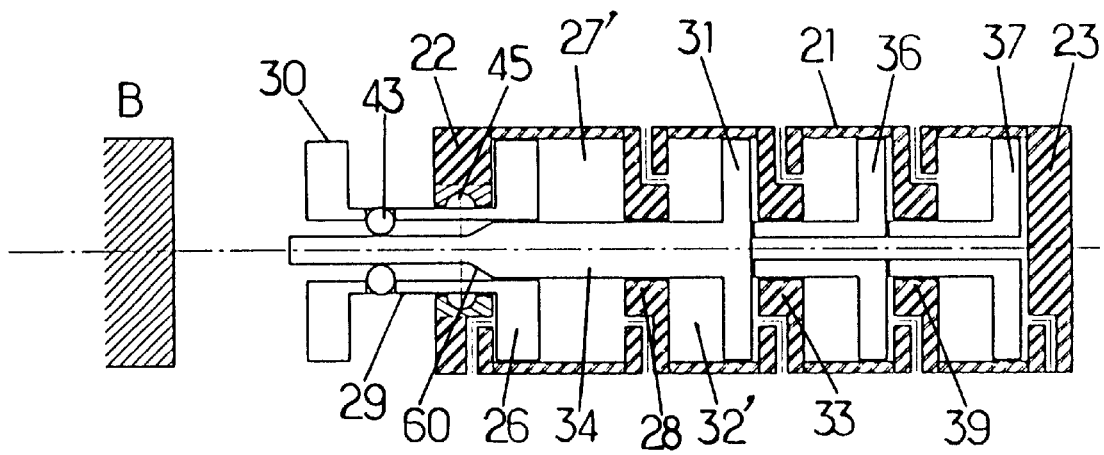
Figure 7B:
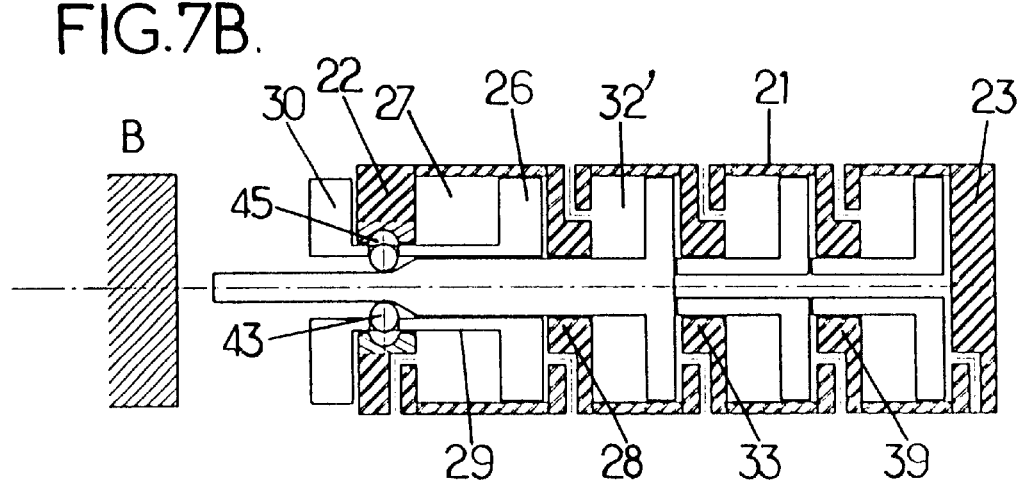
Figure 7C:
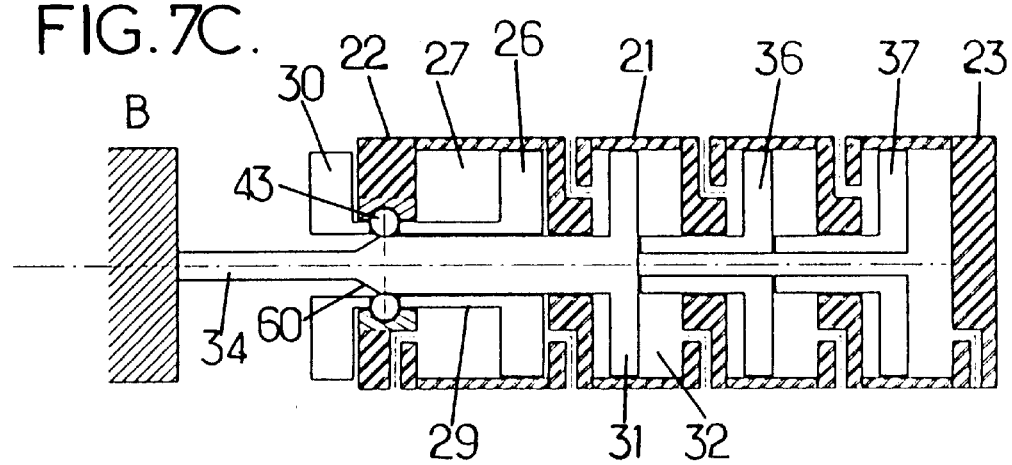

The embodiment illustrated in FIGS. 7A to 7C is of the same type as that illustrated in FIGS. 6A to 6C but simplified: there is no positioning rod 35 and the ramp 60 acting on the lock bearings 43 is disposed directly on the working rod 34.

From the wide open position illustrated in FIG. 7A, the displacement of the actuator body 21 towards the left moves the pockets 45 of the front cylinder head 22 opposite the bearings 43 of the pre-stroke rod 29. The equivalent displacement of the working rod 34 (the working piston 31 abutting against its cylinder head 33), causes a shift to the slightly open position illustrated in FIG. 7B. Applying pressure to the working pressure chamber 32 then causes the working rod 34 to be displaced to the left until it reaches the position illustrated in FIG. 7C. It should be pointed out that once this displacement is initiated, the ramps 60 (or conical part) of the rod 34 force the bearings 43 into the pockets 45 of the cylinder head 22, which also has the effect of locking the pre-stroke piston 26 relative to the actuator body 21. Since the pre-stroke piston 26 is fixed, the body 21 of the actuator is no longer able to "retreat" to the right, even at a high clamping pressure.

In other words, it will still be possible, as a result of the invention, to apply a reduced pre-stroke force whilst conserving a high clamping force, which will save on pressurised fluid and bring a gain in response time. Secondly, it will still be possible to multiply the number of amplification stages without disproportionately increasing the length or volume of the actuator.

What is claimed is:

1. Actuator effecting an approach pre-stroke and a working stroke for maneuvering a tool, comprising an actuator body in which at least two pistons are mounted so as to be able to slide in the actuator body, either in the same direction or in opposite directions, when extracted from the actuator body, namely a pre-stroke piston and at least one working piston actuating the tool, said actuator further comprising locking means disposed between said actuator body and a pre-stroke rod joined to said pre-stroke piston, these locking means operating at least in the retraction direction thereof, characterised in that said working rod and said pre-stroke rod are displaced in the same direction between their retracted position inside said actuator body and their extracted position, the working rod being slidably mounted in an axial compartment of the pre-stroke rod.

2. Actuator according to claim 1, wherein the locking means comprise at least one lock designed to slide transversely in a front cylinder head of said actuator body, this lock being provided in the form of a small piston and being biased, by an external pressure, so as to lock in a pocket of said pre-stroke rod, by compressing a return spring in the unlocking position.

3. Actuator according to claim 1, wherein said locking means comprise, in a rear cylinder head of the body of said actuator, a crown coaxial with said pre-stroke rod and designed to be returned to an unlocking position by peripherally acting springs, the rotating motion of this crown against the return force being generated by applying external energy or automatically when said pre-stroke piston reaches the end of the approach pre-stroke thereof, thereby biasing a lock or locks to be engaged in compartments of said pre-stroke rod.

4. Actuator according to claim 3, wherein on a face directed towards said rear cylinder head, said pre-stroke piston has conical tips designed to locate in respective bores of said crown and to pivot the latter into the locking position thereof, these tips being slightly offset from said bores when said crown is not operating, in the unlocking position.

5. Actuator according to claim 1, further comprising a catch or catches biased by springs in a direction which causes said catch or catches to project from the lateral surface of said pre-stroke piston enabling said catch or catches to engage in notches of the actuator body, thereby locking said pre-stroke piston relative to this body, at least in the retraction direction thereof, and said working piston having ramps designed to act on tails of said catches, when returning said working piston to the fully retracted position thereof, thereby returning said catch or catches to the unlocking position.

6. Actuator according to claim 1, wherein said locking means comprise a lock or locks radially displaceable in appropriate recesses of said pre-stroke rod and designed to locate in pockets of a front cylinder head of the body of said actuator.

7. Actuator according to claim 6, wherein the lock or locks may be engaged in said pockets by a positioning ramp of said working rod.

8. Actuator according to claim 7, wherein said positioning rod is maneuvered by said working rod between a position in which said locks are released and said position in which said locks are engaged in said pockets, this working rod having, for this purpose, firstly a shoulder designed to push axially, by means of an elastic element, said positioning rod towards the position in which said positioning rod engages the lock or locks and, secondly, an outer stop designed to return said positioning rod into said position in which said lock or locks are released as said working rod is retracted.

9. Actuator according to claim 6, wherein said lock or locks may be engaged in said pockets by a ramped positioning rod slidably mounted on said working rod inside said pre-stroke rod.

10. Actuator according to claim 1, wherein said working piston is joined to one or more amplifier pistons each being displaceable in an amplifier chamber to which said pressurized fluid is applied.

* * * * *